R. PINTO.
CHEESE CUTTER.
APPLICATION FILED APR. 16, 1912.
1,044,080.
Patented Nov. 12, 1912.
2 SHEETS—SHEET 1.
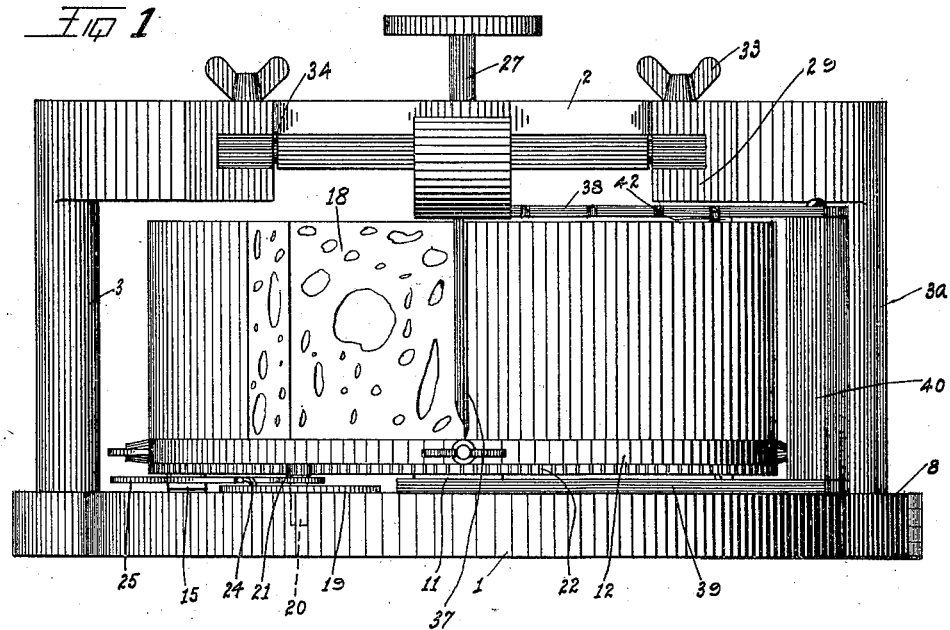
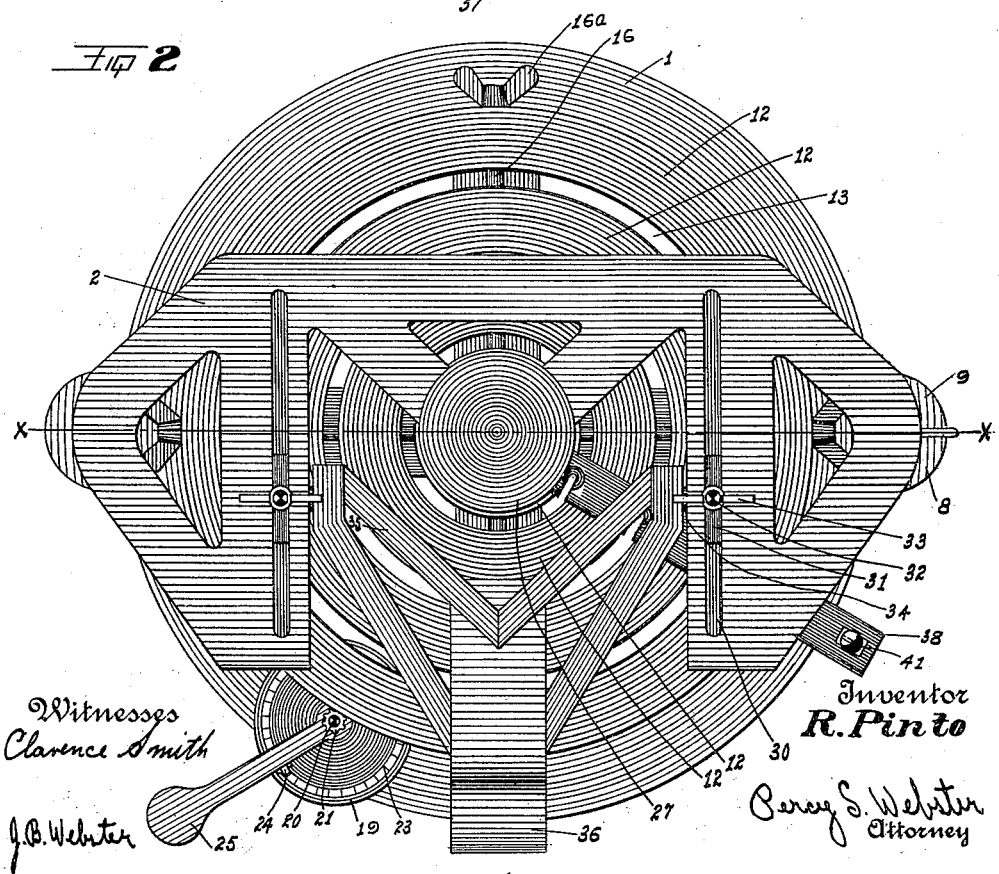
Witnesses
Clarence Smith
J.B. Webster
Inventor
R. Pinto
Percy S. Webster
Attorney R. PINTO.
CHEESE CUTTER.
APPLICATION FILED APR. 16, 1912.
1,044,080.
Patented Nov. 12, 1912.
2 SHEETS—SHEET 2.
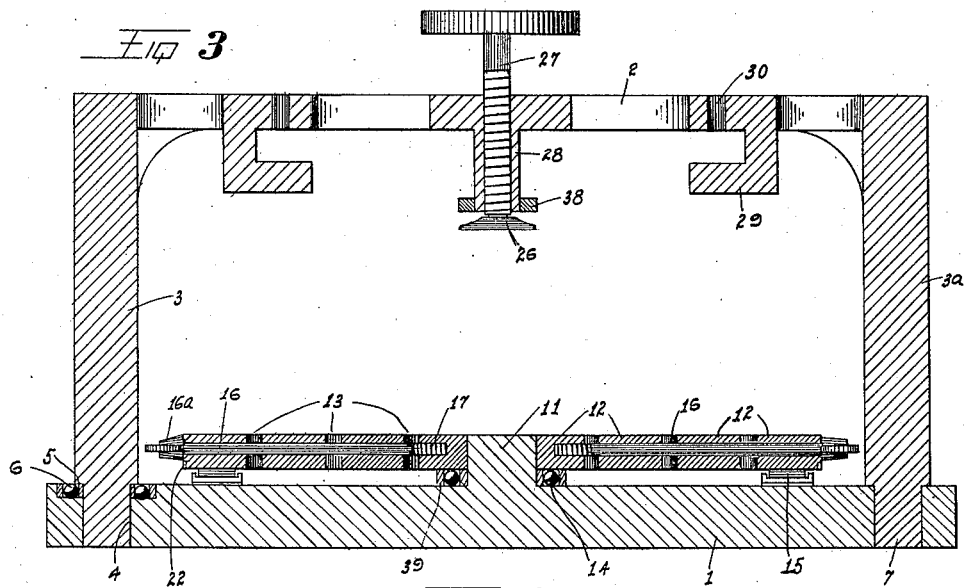
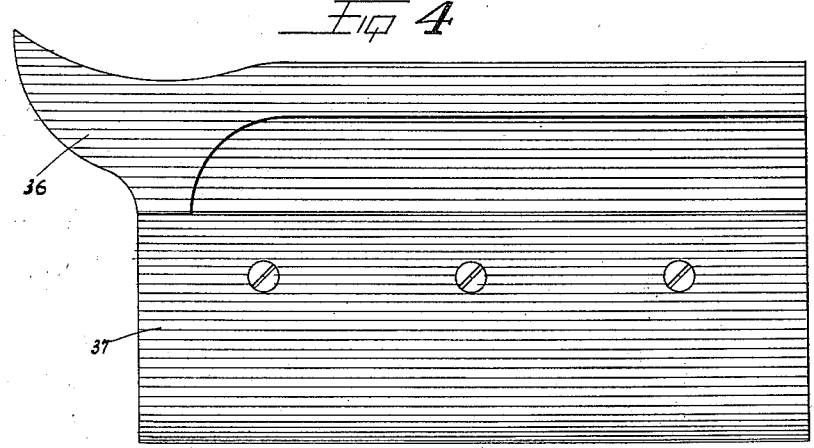
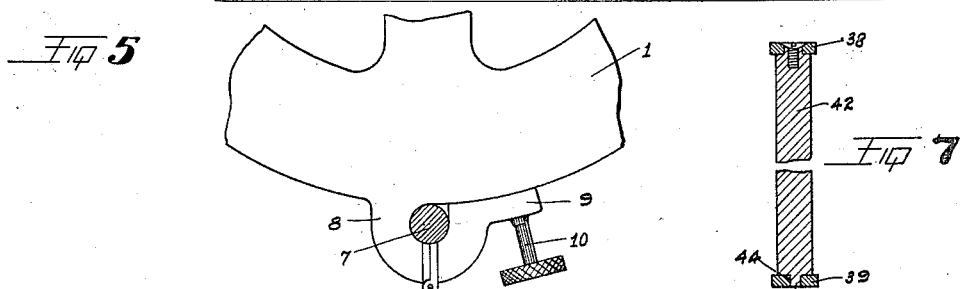
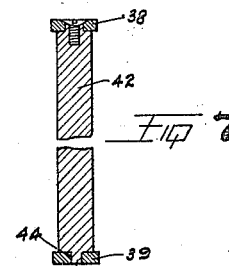
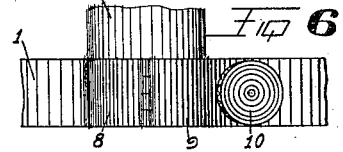
Inventor
R. Pinto
Percy S. Webster
Attorney

UNITED STATES PATENT OFFICE.

RALPH PINTO, OF STOCKTON, CALIFORNIA.

CHEESE-CUTTER.

1,044,080.

Specification of Letters Patent. Patented Nov. 12, 1912.

Application filed April 16, 1912. Serial No. 691,181.

*To all whom it may concern:*

Be it known that I, RALPH PINTO, a citizen of the United States, residing at Stockton, in the county of San Joaquin, State of California, have invented certain new and useful Improvements in Cheese-Cutters; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in cheese cutters of all kinds and is particularly designed for the purpose of cutting imported cheese such as Swiss cheese or other similar imported cheese which comes in large and heavy packages weighing several hundred pounds and which is now merely cut with a knife owing to the difficulty in cutting the exact weight with a suitable machine.

The object of the invention is to produce a device upon which the cheese may be readily disposed and thereafter cut both circumferentially and vertically to permit the same being retailed in small pieces of suitable size and shape.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

In the drawings similar characters of reference indicate corresponding parts in the several views.

Figure 1 is a front elevation of the complete device showing the cheese in position. Fig. 2 is a top plan view of the complete cutter. Fig. 3 is a sectional view taken upon a line X—X of Fig. 2. Fig. 4 is a side view of the vertical cutting knife. Fig. 5 is a detached view of the hinge structure. Fig. 6 is an end view of the same. Fig. 7 is a sectional view showing the manner of securing a cutting blade in its frame.

Referring now more particularly to the characters of reference on the drawings, the numeral 1 designates a base supporting platform of any desired construction or shape, while the numeral 2 designates a supporting frame provided with pillars 3 and $3^a$. The pillar 3 is turnably disposed in the platform 1 as at 4 and has a shoulder 5 suitably mounted on ball-bearings 6. The pillar $3^a$ has its lower end 7 adapted to project into a recessed lug 8 on the other side of the platform 1 which recessed lug has hinged thereto a similar lug 9 adapted to hold the member 7 normally in the recessed member 8. The member 9 is adapted to be suitably fixed in closed position by means of a set screw 10 projecting through said member 9 and adapted to engage the side of the platform 1.

Projecting upwardly from the center of the platform 1 is a small pin or stub 11 turnably disposed around which is a cheese supporting table or platform comprising a plurality of circumferentially disposed leaves 12 disposed concentrically within each other and spaced equally from each other leaving an intervening space as at 13. In practice there may be as many of these members 12 as desired according to the size of the cheese, and the function of the same will appear as this description is proceeded with.

The inner one of the members 12 is turnable on any suitable ball or roller bearing 14 as is also the outer member 12 mounted on a suitable bearing 15, all of said members 12 being suitably joined together by means of pins 16, projecting through all of said members 12 and screw mounted into the innermost one as at 17.

In practice the cheese 18 is mounted on these table members 12 and may be turned in any direction by means of the following structure to-wit: A disk 19 is provided with a pin 20 journaled in the platform 1 and projecting upwardly and provided with a gear 21 on its upper end, which gear intermeshes with a gear 22 formed on the outer lower edge of the outer one of the members 12.

Around the upper edge of the disk 19 is a ratchet rack 23 adapted to be engaged by a dog 24 flexibly connected with an operating handle member 25 turnably mounted on the pin 20 between the disk 19 and the gear 21. As will be seen, by operating the member 25 in one direction it will cause the dog 24 to engage the ratchet rack 21 and turn the disk 19 which action will turn the pin 20 and the gear 21 and incidentally the table members 12 and the cheese 18.

To enable the cheese 18 to be readily mounted on the table members 12 as above set forth, the member 9 is turned away from the pin 7 which then leaves the members 3 and 3ª and frame 2 and its connecting members (to be hereinafter described) to be turned on the bearing 6 which leaves the intervening space free so that there will be no obstacle in the way when the heavy cheese is being placed in position. Then after the cheese is in position the members 3, 3ª and 2 are returned to their former position and locked in such position by means of the members 9 and 10. Then in order to keep the cheese in the proper central position upon the table members 12 a disk 26 is screwed down against the top of the same by means of a thumb screw 27 disposed through a boss 28 depending from the center of the frame 2. The said frame 2 is provided with two parallel slotted guides 29 spaced apart communicating with which are slots 30 disposed in said frame 2. Slidable in said slotted guides 29 are blocks 31 provided with pins 32 projecting through the slots 30 whereby the blocks 31 may be fixed in any desired position by means of wing nuts 33 mounted on said pins 32 and adapted to impinge against the frame 2.

Projecting from the sides of the blocks 31 are pins 34 flexibly connected to which is a hanger frame 35 provided with a projecting handle member 36 secured to which is a cutter knife 37 adapted to cut vertically through the cheese. As will readily be seen the width of the cut of said knife can be adjusted by means of the movement of the blocks 31 through the slotted guides 29.

As will be readily conceived, it would not be practical to cut for retail purposes a piece of cheese from the center to the outer circumference of a three hundred pound cheese hence I have devised for coöperative use with the blade 37 another knife adapted to cut said cheese in a circumferential manner which knife is substantially described as follows: A projecting arm 38 is turnably mounted on the boss 28 and projects across the top of the cheese to its outer circumference and a similar arm 39 is turnably disposed around the ball-bearing 14 and projects beneath the table members 12 to the outer circumference thereof, said two arms being connected by a vertical handle member 40 secured to the bottom arm 39 in any desirable manner and to the upper arm 38 by means of a removable screw 41. When about to be used the screw 41 is removed which permits the arm 38 to be raised up from the boss 28 and a blade 42 to be inserted in position through one of the spaces 13 and then secured to said arms 38 and 39 by means of square lugs 43 adapted to project into square holes 44 in said arms 38 and 39 and then the screw 41 is again inserted and the arm 38 secured to the member 40 which then holds the knife in position. To permit of this operation of course a small slot shall have to be first cut in the side of the cheese. Then by grasping the handle member 40 the knife 42 may be used to cut a circumferential cut in the cheese 18 being moved through one of the spaces 13 and when this is done the knife 37 may be cut vertically through said cheese which permits of a suitable sized piece of the cheese to be cut for retail purposes. Of course the blade 42 would be first moved through the outermost space 13 and then gradually transferred into the inner ones as the cheese is reduced in size. As the members 12 are turned and the blade 42 comes in contact with one of the connecting rods 16 such rod 16 may be removed temporarily and the blade moved past the same and for this purpose I provide operating wings 16ª on the outer ends of said rods 16 in order to facilitate in this operation. Of course as the blade 42 is moved to the inner one of the spaces 13 the frame 35 will be correspondingly moved toward the center of the frame 2 by means of its sliding adjustment heretofore fully set forth.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising a platform, a supporting platform turnably mounted on said first named platform, a frame held upwardly from said platform and being turnably mounted thereon at one side, and a cutting means carried by said frame, as described.

2. A device of the character described comprising a platform, a frame, a pillar on said frame turnably mounted in one side of said platform, means for securing said frame in fixed position on said platform and a cutting means carried by said frame, as described.

3. A device of the character described comprising a platform, a frame held upwardly from said platform, slotted guides on said frame, another frame slidably disposed in said slotted guides, and a cutting means carried by said last named frame, as described.

4. A device of the character described comprising a platform, a frame held upwardly from said platform, slotted guides on said frame, another frame movable in said slotted guides, means for fixing said last named frame in any predetermined position in said slotted guides, and a cutting means carried by said last named frame, as described.

5. A device of the character described comprising a platform, a frame held upwardly from said platform, slotted guides in said frame, blocks movable in said guides, said frame being provided with slots communicating with said slotted guides, pins on said blocks projecting through said slots, nuts mounted on said pins and a cutting means operatively connected with said blocks, as described.

6. A device of the character described comprising a platform, a retaining table turnably mounted on said platform, said table comprising a plurality of independent circular leaves mounted concentrically one within the other, each of said leaves being spaced a distance from the other and a cutting means mounted on said platform, as described.

7. A device of the character described comprising a platform, a retaining table turnably mounted on said platform and comprising a plurality of independent circular leaves disposed concentrically one within the other, pins projecting through all of said leaves and adapted to be secured in fixed position with respect to each other, and a cutting means mounted on said platform, as described.

8. A device of the character described comprising a platform, a retaining table mounted on said platform, such table being provided with a plurality of concentrically disposed slots, and a cutting means adapted to operate through said slots, as described.

9. A device of the character described comprising a platform, a retaining table turnably mounted on said platform, and provided with a plurality of concentrically disposed slots, a blade adapted to project through said slots, and a turnable frame adapted to carry said blade, as described.

10. A device of the character described comprising a platform, a circular retaining table mounted on said platform, a cutting means adapted to cut vertically, and a cutting means adapted to cut circumferentially, both of said cutting means being mounted on said platform, as described.

11. A device of the character described comprising a platform, a circular table on said platform, a gear mounted on said circular table, a disk turnably mounted on said platform, a pin on said disk, a gear on said pin engaging said first named gear, and means for turning said disk, as described.

In testimony whereof I affix my signature in presence of two witnesses.

RALPH PINTO.

Witnesses:
STEPHEN N. BLEWETT,
CLARENCE SMITH.

---

Copies of this patent may be obtained for five cents each, by addressing the "Commissioner of Patents, Washington, D. C."